US009073424B2

(12) United States Patent
Vogler et al.

(10) Patent No.: US 9,073,424 B2
(45) Date of Patent: Jul. 7, 2015

(54) STATOR HOLDING PLATE WITH INVERTER FASTENING FUNCTION

(75) Inventors: Tobias Vogler, Herzogenaurach (DE); Raphael Fischer, Herzogenaurach (DE); Mark Lauger, Goessweinstein (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/131,044

(22) PCT Filed: Apr. 11, 2012

(86) PCT No.: PCT/EP2012/056486
§ 371 (c)(1),
(2), (4) Date: Jan. 6, 2014

(87) PCT Pub. No.: WO2013/004409
PCT Pub. Date: Jan. 10, 2013

(65) Prior Publication Data
US 2014/0117744 A1    May 1, 2014

(30) Foreign Application Priority Data

Jul. 7, 2011  (DE) .......................... 10 2011 107 395
Aug. 26, 2011  (DE) .......................... 10 2011 081 657

(51) Int. Cl.
*B60K 6/20*     (2007.10)
*B60K 7/00*     (2006.01)
*B60B 3/14*     (2006.01)
*B60B 3/16*     (2006.01)

(52) U.S. Cl.
CPC ....... *B60K 7/0007* (2013.01); *B60K 2007/0038* (2013.01); *B60K 2007/0092* (2013.01); *B60B 3/147* (2013.01); *B60B 3/16* (2013.01); *B60B 2900/111* (2013.01); *B60B 2900/311* (2013.01)

(58) Field of Classification Search
CPC .................................... B60K 1/00; B60K 6/48
USPC ................... 180/65.51, 65.21, 65.285, 65.31
See application file for complete search history.

(56) References Cited

U.S. PATENT DOCUMENTS

| 2,506,146 | A  | * | 5/1950  | Gladish ....................... 310/67 R |
| 4,913,258 | A  | * | 4/1990  | Sakurai et al. ................ 180/242 |
| 5,382,854 | A  |   | 1/1995  | Kawamoto et al. |
| 6,626,652 | B2 | * | 9/2003  | Koyama et al. ............ 417/423.1 |
| 7,121,367 | B2 | * | 10/2006 | Ajiro et al. ................. 180/65.51 |
| 7,233,093 | B2 | * | 6/2007  | Arimitsu ....................... 310/266 |
| 7,479,718 | B2 | * | 1/2009  | Kikuchi et al. ............. 310/68 R |
| 7,888,828 | B2 | * | 2/2011  | Takahashi et al. .............. 310/54 |

(Continued)

FOREIGN PATENT DOCUMENTS

| AT | 44 084       | 6/1989 |
| DE | 103 38 659   | 3/2005 |
| DE | 10 2006 002 421 | 7/2006 |
| DE | 10 2008 004 083 | 7/2009 |

(Continued)

*Primary Examiner* — Hau Phan
(74) *Attorney, Agent, or Firm* — Davidson, Davidson & Kappel, LLC

(57) ABSTRACT

A stator holding plate (1) for a wheel hub drive system, in particular for an electric and/or hybrid vehicle, which stator holding plate has a stator fastening portion (S) for the fastening of a stator (103, 105) of an electric motor to the stator holding plate (1) and has an inverter fastening portion (I) for the fastening of an inverter (30) to the stator holding plate (1). A wheel hub drive system equipped with the same.

4 Claims, 7 Drawing Sheets

(56) References Cited

U.S. PATENT DOCUMENTS

| | | |
|---|---|---|
| 8,476,794 B2 * | 7/2013 | Amutham .................. 310/68 B |
| 2004/0079566 A1 | 4/2004 | Radomile et al. |
| 2005/0252701 A1 | 11/2005 | Shimizu |
| 2006/0158050 A1 | 7/2006 | Maeda et al. |
| 2007/0257570 A1 | 11/2007 | Walter et al. |
| 2008/0053719 A1 | 3/2008 | Yoshino et al. |
| 2012/0242137 A1 | 9/2012 | Fischer et al. |

FOREIGN PATENT DOCUMENTS

| | | |
|---|---|---|
| DE | 10 2008 0199 74 | 11/2009 |
| DE | 10 2010 049 610 | 6/2011 |
| EP | 1 707 429 | 10/2006 |
| EP | 2 279 938 | 2/2011 |
| JP | 2006 246 678 | 9/2006 |
| JP | 2011-011685 | 1/2011 |

* cited by examiner

A-A

B-B

STATOR HOLDING PLATE WITH INVERTER FASTENING FUNCTION

The present invention relates to stator holding plate for a wheel hub drive system, in particular for an electric and/or a hybrid vehicle, and to a wheel hub drive system.

BACKGROUND

Interest in electric vehicles has increased more and more in recent years, in particular due to a growing environmental awareness.

Central and wheel-proximal electric motors as well as electric wheel hub drives, among other things, may be used in electric cars. Electric wheel hub drives are a special design of an electric motor and include an electric motor which is integrated into a wheel of a vehicle and simultaneously supports the wheel hub in such a way that a part of the motor rotates together with the wheel.

An electric motor conventionally has a rotor, which is rotatably supported around a rotation axis, and a stator, which is stationary in relation to the rotor.

In an internally rotating wheel hub drive system, a so-called internal rotor, the rotor may be situated, for example, inside the stator. In an externally rotating wheel hub drive system, a so-called external rotor, the rotor may be situated, for example, outside the stator.

SUMMARY OF THE INVENTION

It is an object of the present invention to provide a stator holding plate for a wheel hub drive system, in particular for an electric and/or a hybrid vehicle, which includes a stator fastening section for fastening a stator of an electric motor to the stator holding plate.

The present invention provides a plate-shaped stator holding element that may be advantageously manufactured cost-effectively and mounted easily. In particular, a wheel hub drive system having a stator holding plate may be mounted much more easily and with a better use of installation space than a cup-shaped or box-shaped stator holding element. In addition, the stator holding plate advantageously allows some or even most of the non-rotating components of the wheel hub drive system to be fastened thereto. For this purpose, the stator holding plate may include not only the stator fastening section but, in particular, an inverter fastening section for fastening an inverter to the stator holding plate. A compact wheel hub drive system may thus be advantageously provided. Situating the inverter in the wheel hub drive system is also associated with numerous additional advantages, which are explained below.

For reasons of function and/or installation space, the stator holding plate may have a three-dimensional design and include, for example, elevations and/or indentations, for example bulges and/or recesses.

A plate may be understood to be, in particular, a body whose maximum extension in a first spatial direction and a second spatial direction perpendicular to the first spatial direction is many times greater that its maximum extension in a third spatial direction perpendicular to the first and second spatial directions, for example by a factor of at least approximately ≥3, for example by approximately ≥5. The body may have an essentially uniform material or wall thickness. In addition to the material or wall thickness, the maximum extension of the body in the third spatial direction may be based on one or multiple bulges of the body from a plane defined by the first and second spatial directions. The maximum extensions in the first and second spatial directions may be greater than the material or wall thickness by a factor of, for example, approximately ≥10. For example, the maximum extension in the first and second spatial directions may be greater than the material or wall thickness at least by a factor of ≥20, for example by approximately ≥50 or ≥75, in each case.

An inverter may be understood to be, in particular, a system for conversion between a direct voltage and an alternating voltage. A device of this type may also be referred to as a converter.

A resolver may be understood to be, in particular, a system for measuring the angle, in particular, between the stator and the rotor of an electric motor. The measured values of a resolver may be used, for example, for the commutation of an electric motor. The resolver may therefore also be referred to as the rotor position detector. The resolver may include, in particular, a rotatably mountable or mounted resolver rotor and, adjacent thereto, a resolver stator which is mountable or mounted in a stationary manner. The resolver rotor may be mountable or mounted, in particular, on a rotatable component of the wheel hub drive system, for example on the rotor of the electric motor, a rotor support or a rotatable ring of a wheel bearing. In particular, the resolver rotor and the resolver stator may be positioned opposite each other. In particular, the resolver rotor and the resolver stator may be situatable or situated adjacent to each other in the axial direction with regard to the rotation axis of the drive system. In particular, the resolver may be a PC board resolver. The PC board resolver may include, for example, a rotating passive board (resolver rotor) and a non-rotating or active board (resolver stator) which is stationary thereto. In particular, a resolver air gap may be present between the resolver rotor and the resolver stator.

In addition to electromagnetically acting components such as windings and inductance-increasing components (lamination stack), a stator of an electric motor (electric motor stator) may include additional components such as a stator housing, a stator cooling system or a stator cooling housing.

In addition to components that actively convert voltage, such as a DC-link capacitor/power electronics and a controller, an inverter may also include additional components, such as an inverter housing, an inverter cooling system or an inverter cooling housing.

A guiding may be understood to mean, in particular, both a lead of a component through an opening in another component and a bypass of one component around another component, for example with the aid of a recess in an edge section of the other component.

The stator holding plate may be made, for example, of a metal or a metal alloy, for example steel.

Within the scope of one embodiment, the stator holding plate is manufactured by forming, for example deep drawing, and/or by casting. The stator holding plate may thus advantageously be manufactured, for example from sheet metal, using methods suitable for mass production. At least some function surfaces may be reworked later on, in particular using machining or cutting methods.

For example, the stator holding plate may have a wall or material thickness of approximately ≥3 mm, for example approximately ≥4 mm, for example approximately ≥3 mm to approximately ≤6 mm. The wall or material thickness may vary, in particular as a function of the wheel size and system mass of the wheel hub drive. In the case of most wheel sizes commonly used for passenger cars, and within an achievable system mass range, a sufficiently stable stator holding plate may advantageously be provided due to a wall or material thickness of ≥3 mm to ≤6 mm, one which also withstands higher loads and is suitable for keeping the magnet/air gap between the stator and rotor stable, even under loads.

The stator fastening section may include, in particular, at least one stator fastening opening for fastening the stator to the stator holding plate. In particular, it may be a bore hole and/or a thread and/or a bore hole having an insertable threaded bushing. The stator fastening opening may be used, in particular, for fastening the stator to the stator holding plate with the aid of a screw, rivet and/or pin connection.

The stator fastening section may furthermore include a stator centering element for centering the stator on the stator holding plate, in particular with regard to a rotation axis of the wheel hub drive. For example, the stator centering element may be based on a movable plug connection. For example, the stator holding plate may have a groove, for example in the form of an undercut, and the electric motor stator or its housing or cooling system may have a collar which is movably insertable into the groove in the stator holding plate, or vice versa. For example, a concentricity may thus be ensured between the stator and the stator holding plate or the wheel bearing.

The stator fastening section may furthermore have, in particular, recesses, for example in the edge section of the stator holding plate. As explained below, these recesses may be used to bypass signal lines and/or coolant lines around the stator holding plate. Recesses of this type may also be used to improve the accessibility of connecting elements to be mounted thereunder, for example for screwing screws and/or for reducing weight.

For example, the stator fastening section may have at least one stator fastening tab which is equipped with a stator fastening opening.

Within the scope of another embodiment, the stator holding plate furthermore includes a wheel bearing and/or stator holding plate fastening section for fastening a wheel bearing to the stator holding plate and/or for fastening the stator holding plate to a wheel support, for example a torsion beam.

The wheel bearing and/or stator holding plate fastening section may include, in particular, at least one wheel bearing centering opening for centering the wheel bearing, in particular a stationary wheel bearing ring, on the stator holding plate. For example, the wheel bearing centering opening may be a press fit.

The wheel bearing and/or stator holding plate fastening section may furthermore include, for example, at least one wheel bearing fixing opening for fixing the wheel bearing, in particular the stationary wheel bearing ring, on the stator holding plate during assembly. In particular, it may be a bore hole and/or a thread and/or a bore hole having an insertable threaded bushing. The wheel bearing fixing opening may be used, in particular, for fixing the wheel bearing on the stator holding plate with the aid of a screw, rivet and/or pin connection.

Alternatively or additionally, the wheel bearing and/or stator holding plate fastening section may include at least one bolt lead-through opening for fixing the wheel bearing, in particular the stationary wheel bearing ring, on the stator holding plate and/or for fixing the stator holding plate on the wheel support. The bolt lead-through opening may be used to fix the wheel bearing on the stator holding plate and/or the stator holding plate on the wheel support during assembly as well as during operation of the wheel hub drive system. In particular, it may be a bore hole and/or a thread and/or a bore hole having an insertable threaded bushing. The bolt lead-through opening may be used, in particular, for fixing the wheel bearing on the stator holding plate with the aid of a screw, rivet and/or pin connection.

In particular, the wheel bearing and/or stator holding plate fastening section may include at least one wheel bearing and/or stator holding plate fastening opening for fastening the wheel bearing, in particular the stationary wheel bearing ring, to the stator holding plate and/or for fastening the stator holding plate to the wheel support. The wheel bearing and/or stator holding plate fastening opening may ensure, in particular, a secure attachment during operation of the wheel hub drive system. In particular, it may be a bore hole and/or a thread and/or a bore hole having an insertable threaded bushing. The wheel bearing and/or stator holding plate fastening opening may be used, in particular, for fastening the wheel bearing to the stator holding plate and/or the stator holding plate to the wheel support and/or the stator holding plate to the wheel support with the aid of a screw, rivet and/or pin connection. The wheel bearing and/or stator holding plate fastening opening may advantageously be used both for fastening the wheel bearing to the stator holding plate and for fastening the stator holding plate to the wheel support, for example in that a bolt, which may be fastened to the wheel support, is insertable through the wheel bearing and/or stator holding plate fastening opening in the stator holding plate and through a fastening opening provided on the wheel bearing.

The wheel bearing and/or stator holding plate fastening section may include, for example, at least one wheel bearing sealing groove for a seal for forming a seal between the wheel bearing, in particular the stationary wheel bearing ring, and the stator holding plate. A seal may be inserted or sprayed into the wheel bearing sealing groove, with the aid of which the interior of the motor may be advantageously sealed. The wheel bearing sealing groove may be designed, for example in the form of a self-contained groove which surrounds the openings provided in the wheel bearing and/or stator holding plate fastening section.

The stator holding plate may furthermore have an ABS sensor lead-through opening for leading an ABS sensor or its signal lines through the stator holding plate. The ABS sensor lead-through opening may be provided, for example, in the wheel bearing and/or stator holding plate fastening section.

The stator holding plate may include one or multiple reinforcing sections.

The stator holding plate may furthermore include a signal line guiding section for guiding or leading at least one signal line, for example of a temperature sensor and/or an interlock sensor, around or through the stator holding plate.

The stator holding plate may furthermore include a coolant line guiding section for guiding or leading at least one coolant line around or through the stator holding plate. In particular, the coolant line guiding section may be designed in such a way that an inverter cooling system is connectable to an electric motor cooling system.

Within the scope of another embodiment, the stator holding plate furthermore includes a brake anchor plate section for fastening a brake mechanism of a drum brake to the stator holding plate.

In this way, the flow of force of the electric motor as well as the flow of force of the drum brake may be advantageously transmitted through the stator holding plate.

The brake mechanism may include, for example, non-rotating components of a drum brake, in particular for applying force to the rotating brake drum, for example brake cylinders, brake shoes, brake shoe counter-bearings, brake shoe abutments, etc.

The brake anchor plate section may include, in particular, at least one brake cylinder section for mounting a brake cylinder.

The brake anchor plate section may furthermore include at least one brake shoe counter-bearing section for fastening a brake shoe counter-bearing.

The brake anchor plate section may also include at least one brake shoe abutment section for supporting the brake shoes and/or for fastening the brake shoe bearing.

In particular, the brake cylinder section may include at least one brake cylinder fastening opening for fastening the brake cylinder to the stator holding plate. In particular, it may be a bore hole and/or a thread and/or a bore hole having an insertable threaded bushing. The brake cylinder fastening opening may be used, in particular, for fastening the brake cylinder to the stator holding plate with the aid of a screw, rivet and/or pin connection.

The brake cylinder section may furthermore include at least one brake line lead-through opening for leading a brake line through the stator holding plate.

In particular, the brake cylinder section may include at least one brake cylinder venting opening for venting the brake cylinder.

It is possible for one opening to be used both for leading a brake line through the stator holding plate and for venting the brake cylinder.

The brake anchor plate section may furthermore include at least one brake shoe suspension section, in particular a brake shoe suspension opening, for mounting a suspension, for example for applying an axial force directed onto the brake anchor plate section to a brake shoe.

The brake anchor plate section may furthermore include at least one hand brake cable lead-through opening for leading a hand brake cable through the stator holding plate. The hand brake cable lead-through opening may be designed to be oblique at an angle. To facilitate the lead of the hand brake cable, sections for deflecting the hand brake cable may be provided in the stator holding plate.

The brake anchor plate section may furthermore include at least one hand brake maintenance opening for maintaining a hand brake.

The brake anchor plate section may also include at least one brake drum thrust element fastening opening for fastening a thrust element for a brake drum. In particular, it may be a bore hole and/or a thread and/or a bore hole having an insertable threaded bushing. The brake drum thrust element fastening opening may be used, in particular, for fastening a thrust element with the aid of a screw, rivet and/or pin connection.

Since a sealing of the wheel hub drive system may be ensured, in particular, more securely and in a more space-saving manner with the aid of other types of seals than using a labyrinth seal, the brake anchor plate section may be designed to be free of a labyrinth for forming a labyrinth seal.

Within the scope of another embodiment, the stator holding plate furthermore includes a phase guiding section for guiding the phases of the electric motor from one side of the stator holding plate to another side, in particular to the other side of the stator holding plate. For example, the phases of the electric motor may be guided by the phase guiding section from one side of the stator holding plate, on which an inverter is situated, to the other side of the stator holding plate, to which the electric motor stator is fastened. As a result, electric current (phase current) may be advantageously conducted from the vehicle side, for example from the inverter, to the wheel side of the stator holding plate, in particular to the electric motor.

In principle, the phases may be guided in the phase guiding section in the form of cables, bolts or connectors.

In particular, the phase guiding section may be designed to lead or bypass at least two, in particular at least three, phases through or around the stator holding plate. For this purpose, the phase guiding section may have at least two, in particular three, phase guiding openings or recesses, in particular through which the phases may be inserted (lead-through, opening) or on which the phases may be laterally placed (bypass, recess).

To lead a phase through the stator holding plate, the phase guiding section may have, in particular, at least two, in particular at least three, phase lead-through openings.

If cables are used, conventional insulation layers may be used for electrical insulation of the phases. If current-conducting bolts are used, a separate electrical insulation may be used in particular. This insulation may be provided in the form of insulating sleeves made of plastic or with the aid of an electrically insulating coating, for example a rubber coating, on the bolts.

Insulating sleeves, for example made of plastic, may be provided for electrical insulation, in particular in the phase lead-through openings.

To simplify assembly, the insulating sleeves of two or multiple phases may be integrated into one, in particular a one-piece, phase insulating element, which is another subject matter of the present invention.

The phase insulating element may be designed, for example, to electrically insulate a phase conducting bolt, for example of an electric motor, in particular of a wheel hub drive system.

In particular, the phase insulating element may have a base plate section having at least two, for example at least three, openings and at least two, in particular at least three, insulating sleeve sections. The insulating sleeve sections may be connected to the base plate section, in particular in such a way that, in each case, one opening of the base plate section overlaps with one, in particular matching, opening of an insulating sleeve section, in particular forming a lead-through for a phase conducting bolt. The longitudinal axes of the insulating sleeve sections may be, for example, essentially parallel to each other and essentially perpendicular to the plane of the base plate section. The number of base plate openings may correspond, in particular, to the number of insulation openings.

The phase insulating element may be made of plastic, for example with the aid of an injection molding and/or casting method.

Due to the phase insulating element, all phases of the electric motor may be advantageously insulated by insulating sleeves combined into one component, which substantially simplifies assembly.

During assembly, the insulating sleeves of the phase insulating element may be inserted through openings in the stator holding plate, the base plate abutting one side of the stator holding plate, for example to which the electric motor stator is fastenable or fastened. Before introducing the phases into the insulating sleeves, the component may be cast, for example, in the stator casting compound. This results in the advantage that not only are the phases insulated by the component, but an angle alignment of the electric motor stator in relation to the stator holding plate may take place, which allows the assembly to be further simplified.

Within the scope of another embodiment, the stator holding plate furthermore includes an inverter fastening section for fastening an inverter to the stator holding plate.

By fastening an inverter to the stator holding plate and thus adjacent to the electric motor of the wheel hub drive system and outside the passenger cell, the electromagnetic compatibility (EMC) within the passenger cell may be advantageously improved, in particular since AC power lines may be dispensed with in the passenger cell area. The usable space in the vehicle may also be enlarged thereby. In addition, the amount of work needed to lay cables in the vehicle may be reduced. Moreover, an arrangement of this type makes it possible to easily connect the coolant lines of the electric motor cooling system and an inverter cooling system and thereby achieve a simplified cooling system. Moreover, the control of the wheel hub drive system may be sped up. Furthermore, the stator holding plate makes it possible to integrate both the inverter and a friction brake into the wheel hub drive system.

The inverter fastening section may include, in particular, at least one inverter fastening opening for fastening the inverter to the stator holding plate. In particular, it may be a bore hole and/or a thread and/or a bore hole having an insertable threaded bushing. The inverter fastening opening may be used, in particular, for fastening the inverter to the stator holding plate with the aid of a screw, rivet and/or pin connection.

It is furthermore advantageous if the inverter fastening section and the inverter housing are shaped in such a way that the inverter housing forms a tight seal against the inverter fastening section. A sealing of the entire system may thus be advantageously achieved. In particular, the inverter fastening section may include a mating surface for a static seal between the stator holding plate and the inverter or inverter housing.

If the stator holding plate or the inverter or the inverter housing has an outer surface that is extremely non-planar, which, as such, makes it difficult to achieve a tight seal—for example, due to a significant axial offset in a radial seal guidance with regard to the rotation axis—a transition having a slight incline or a ramp between the two axially offset sections may be used in one or multiple subsections to improve the tightness between the stator holding plate and the inverter or inverter housing.

For this purpose, the inverter fastening section may include, in particular, at least one, in particular two, inverter sealing ramp(s) for transferring a seal which runs, for example, at least partially in the radial direction, in particular to form a seal between the inverter or inverter housing and the stator holding plate, from one section of the stator holding plate to another section of the stator holding plate which is axially offset thereto. The axial transition may be advantageously designed to be smooth. For example, the seal may be inserted or sprayed into a sealing groove in the inverter or in its housing.

To achieve a tight seal between the stator holding plate and the inverter or inverter housing, the inverter fastening openings are preferably provided in an area sealed by the seal.

Within the scope of another embodiment, the stator holding plate furthermore includes a resolver fastening section for fastening a resolver, in particular a resolver stator, to the stator holding plate. A compact wheel hub drive system may thus be advantageously provided.

The resolver, in particular the resolver stator, may be fastened to the stator holding plate with the aid of a resolver stator support. The resolver stator may be connectable or connected to the resolver stator support, for example, with the aid of an adhesive connection. This makes it possible, in particular, to achieve an axial securing of the resolver stator. A resolver stator support provides the advantage of a greater choice of connecting options between the stator holding plate and the resolver stator support. For example, the resolver stator support may be readily connected to the stator holding plate with the aid of a screw, rivet and/or pin connection, which may be difficult using a direct screw, rivet and/or pin connection between a PC board resolver stator and the stator holding plate, due to the mechanical fragility and the necessary active surface of the PC board resolver stator.

To position the resolver stator on the resolver stator support, the resolver stator and the resolver stator support may have connecting elements for establishing an, in particular, axially connectable plug connection, the connecting elements being designed in such a way that the resolver stator is positioned by establishing the plug connection. For this purpose, the resolver stator may have, for example, positioning openings, and the resolver stator support may have, for example positioning pins, or vice versa.

In particular, the resolver fastening section may have a flat design.

In particular, it may be possible to place the resolver stator support or the resolver stator axially on the resolver fastening section.

The resolver fastening section may include, in particular, at least one resolver fastening opening for fastening the resolver, in particular the resolver stator support and/or the resolver stator to the stator holding plate. In particular, it may be a bore hole and/or a thread and/or a bore hole having an insertable threaded bushing. The resolver fastening opening may be used, in particular, for fastening the resolver, in particular the resolver stator support and/or the resolver stator, to the stator holding plate with the aid of a screw, rivet and/or pin connection.

The resolver, in particular the resolver stator support and/or the resolver stator, may be secured by resolver fastening openings in the axial direction and with regard to the angular position. With the aid of a resolver fastening opening in the form of an elongated hole, the angular position, in particular between the stator holding plate and the resolver stator support and thus the resolver stator, may be adjustable or correctable during assembly. In particular, the resolver fastening section may therefore include a resolver fastening opening in the form of an elongated hole.

Alternatively or additionally, the resolver fastening section may include at least one resolver snap-in connecting element, for example a snap-in tab, in particular for axially fixing the resolver, in particular the resolver stator support and/or the resolver stator, on the stator holding plate.

The resolver fastening section may additionally include a resolver centering element, for example a centering diameter, for radially centering the resolver, in particular the resolver stator support and/or the resolver stator, on the stator holding plate, with regard to a rotation axis of the wheel hub drive system.

For reasons of precision, the resolver centering element preferably includes three contact surfaces. However, more than three contact surfaces may also be used.

The resolver centering element may also be integrated into the resolver snap-in connecting elements. For example an axial undercut for the snap-in mechanism may be provided in the area of one contact surface. Accordingly, the stator holding plate may include, in particular, at least three resolver snap-in connecting elements.

The resolver fastening section may furthermore include at least one resolver signal line lead-through opening for leading a signal line of the resolver, in particular the resolver stator, through the stator holding plate.

The brake anchor plate section may at least partially surround, in particular, a central area of the stator holding plate.

The wheel bearing and/or stator holding plate fastening section may be provided, for example, in an area, in particular in this central area, of the stator holding plate.

The stator fastening section may be provided, in particular, in a radially outer area, in particular in the radially outermost area, of the stator holding plate.

For example, the brake anchor plate section and/or the phase guiding section and/or the inverter fastening section and/or the resolver fastening section may be provided between the wheel bearing and/or stator holding plate fastening section and the stator fastening section.

The phase guiding section may be provided, for example, adjacent to the stator fastening section in the radially inward direction.

Sections in the large diameter area of the stator holding plate are particularly suitable for attaching the inverter, since the volume here is large enough to accommodate an inverter, including the DC-link capacitor.

If possible, the inverter fastening section is therefore preferably provided in a radially outer area or in an area adjacent thereto. The inverter fastening section may at least partially surround, in particular, the brake anchor plate section.

The resolver fastening section may also at least partially surround, in particular, the brake anchor plate section.

The resolver fastening section and the inverter fastening section may be provided, in particular, on different sides of the stator holding plate.

The inverter fastening section may be provided, in particular, on the vehicle side of the stator holding plate. This side is particularly suitable for attaching the inverter, since a large volume is available here for accommodating the inverter, including the DC-link capacitor. This also facilitates an advantageous connection to the vehicle, which is associated with additional advantages, which are explained in detail elsewhere.

The resolver fastening section may be provided, in particular, on the wheel side of the stator holding plate. Wheel-side may be understood to be the side of the stator holding plate facing away from the vehicle in the assembled state.

The brake anchor plate section may likewise be provided on the wheel side of the stator holding plate. The brake anchor plate section may be provided with an elevation with regard to the wheel bearing and/or stator holding plate fastening section or the central area of the stator holding plate and/or with regard to the resolver fastening section and/or with regard to the phase guiding section.

Another subject matter of the present invention is a wheel hub drive system, in particular for an electric and/or a hybrid vehicle, which includes an electric motor having an electric motor stator and an electric motor rotor.

The wheel hub drive system may be, for example, a direct drive, i.e., a drive without gears.

The electric motor stator may include, for example, a winding (head) area cast into, in particular, a casting material, and, for example, a laminated stack for increasing the inductance. The electric motor, in particular the electric motor stator, may furthermore include a cooling system, for example a water cooling system, and/or a housing.

The electric motor may be, for example, a permanent magnet synchronous motor (PMSM), for example having a reluctance portion. In principle, the electric motor may be an internal rotor or an external rotor. In particular, the electric motor may be designed as an internal rotor.

Within the scope of one embodiment, the wheel hub drive system includes a stator holding plate according to the present invention. The electric motor stator may be fastenable or fastened, in particular, to the stator holding plate. In particular, the electric motor stator may be fastenable or fastened to the stator fastening section of the stator holding plate.

Within the scope of another embodiment, the wheel hub drive system includes a drum brake. The drum brake may be integrated, in particular, into the wheel hub drive system, for example into the electric motor. For example, the drum brake may be situated radially within the electric motor rotor.

The brake mechanism of the drum brake may be fastenable or fastened, in particular, to the stator holding plate. The brake mechanism of the drum brake may be fastenable or fastened, in particular, to the brake anchor plate section of the stator holding plate.

For example, to prevent heat from being transferred from the drum brake to heat-sensitive components of the electric motor, the wheel hub drive system may include one or multiple shielding elements for shielding against heat radiation and/or one or multiple heat insulation elements for reducing a transfer of heat between components by heat conduction.

The phases of the electric motor may be guided from one side of the stator holding plate to another side, in particular to the other side of the holding plate, for example with the aid of the phase guiding section of the stator holding plate. In particular, the phases of the electric motor may be guided from an inverter on the one side of the stator holding plate to the electric motor stator on the other side of the stator holding plate with the aid of the phase guiding section of the stator holding plate.

Within the scope of another embodiment, the wheel hub drive system includes a phase insulating element according to the present invention. The phase insulating element may be fastenable or fastened, in particular, to the stator holding plate. In particular, the insulating sleeve sections of the phase insulating element may be inserted through openings in the stator holding plate, in particular in the phase guiding section of the stator holding plate. The base plate section may abut, in particular, a side of the stator holding plate to which the electric motor stator may be fastened. In particular, the base plate section of the phase insulating element may be cast into a casting material of the electric motor stator.

Within the scope of another embodiment, the wheel hub drive system includes an inverter. The inverter may include, for example, a power electronics system or a DC-link capacitor. The inverter may furthermore include an inverter cooling system, for example a water cooling system, and/or an inverter housing.

The inverter may be situatable or situated, in particular, adjacent to the electric motor. In particular, the inverter may be fastenable or fastened to the stator holding plate. The inverter may be fastenable or fastened, in particular, to the inverter fastening section of the stator holding plate. The inverter fastening section and the inverter or the inverter housing are preferably shaped in such a way that the inverter or the inverter housing forms a tight seal against the inverter fastening section. In particular, a seal may be situated between the inverter fastening section and the inverter or the inverter housing.

The inverter preferably includes a controller. In addition to controlling and/or regulating the inverter, the controller may be designed, in particular, to control and/or regulate the electric motor. In particular, the exchange between the sensors, controller and power electronics may take place within the wheel hub drive system. The load on the CAN system of the vehicle may thus be relieved. Since the wheel hub drive controller is no longer dependent or is less dependent on a time delay due to CAN buses of the vehicle, the response time of the wheel hub drive system may also be reduced, for example, from 20 ms to 80 ms (if the inverter controller were to be positioned in the vehicle) to 1 ms to 5 ms. This may shorten or even avoid slip phases and achieve a faster stabilization of the vehicle and a more stable and smoother driving behavior of the vehicle, for example in the ABS area.

Within the scope of another embodiment, the wheel hub drive system includes a resolver. The resolver or resolver stator may be fastenable or fastened, in particular, to the stator holding plate. In particular, the resolver or resolver stator may be fastenable or fastened to the resolver fastening section of the stator holding plate. The resolver may be, in particular, a PC board resolver. The resolver stator may be fastenable or fastened to the stator holding plate, in particular with the aid of a resolver stator support. The resolver stator support may be used to connect the resolver stator, in particular with the aid of an adhesive connection. The measured data of the resolver may be advantageously used for motor commutation and vehicle dynamics control.

The wheel hub drive system may furthermore include a wheel bearing. It may be both a wheel bearing having a rotatable outer ring and a wheel bearing having a rotatable inner ring. The wheel bearing may also be fastenable or fastened to the stator holding plate. In particular, the wheel bearing may be fastenable or fastened to the wheel bearing and/or stator holding plate fastening section of the stator holding plate.

The wheel hub drive system, in turn, may be fastenable or fastened to a wheel support, for example a torsion beam, of the vehicle with the aid of the wheel bearing and/or stator holding plate fastening section of the stator holding plate.

The electric motor rotor may be connected, in particular, to the rotatable ring of the wheel bearing. This may be done, for example, with the aid of a rotor support. The resolver rotor may be fastenable or fastened to the rotatable ring of the wheel bearing, to the electric motor rotor or to the rotor support. In particular, the resolver rotor may be fastenable or fastened to the electric motor. The resolver stator and the resolver rotor may be situated axially or radially, in particular axially, in relation to each other, with regard to the rotation axis of the wheel hub drive system.

The wheel hub drive system may furthermore include a wheel rim. The stator holding plate may at least partially close the wheel rim or form an internal chamber with the wheel rim. The wheel rim may be, in particular, a full face or semi full face wheel rim, made, in particular, of steel. A full face or semi full face wheel rim has proven to be advantageous with regard to the available installation space and weight. A conventional wheel rim may advantageously be used for the wheel hub drive system. For example, a 16-inch or 17-inch full face or semi full face wheel rim may be used.

The electric motor, the drum brake, the resolver, the wheel bearing, the rotor support, the shielding element and/or the heat insulating element may be integrated, in particular, into the wheel rim or into the internal chamber formed by the wheel rim and the stator holding plate. The inverter may be fastenable or fastened to the vehicle side of the stator holding plate. The wheel rim may be connected, in particular, to the rotatable ring of the wheel bearing, for example via the rotor support, for example with the aid of a screw connection.

The wheel hub drive system may furthermore include an ABS sensor. The ABS sensor or its signal line may be leadable or led, in particular, through the ABS sensor lead-through opening in the stator holding plate.

The wheel hub drive system may furthermore include one or multiple static seals and/or one or multiple dynamic seals, in particular to protect the internal chamber of the drive system, in particular the magnet/air gap between the electric motor stator and the electric motor rotor, against environmental influences and against contamination. In particular, at least one dynamic seal, for example a lip seal, may be situatable or situated near the wheel bearing. The seal may be holdable or held, for example, by a seal holding plate, for example with the aid of a disk-shaped base body.

The coolant lines of the cooling system of the electric motor and of the inverter may, in particular, be connected to each other. The coolant preferably flows through the inverter cooling system before the electric motor cooling system. The coolant lines may be connected, in particular, by the coolant line guiding section of the stator holding plate. A coolant line connecting the coolant lines of both cooling systems may be bypassed around or led through the stator holding plate with the aid of the coolant line guiding section.

The wheel hub drive system may furthermore include at least two coolant connections for connecting the cooling system(s) to a coolant system of the vehicle, in particular on the vehicle side.

The wheel hub drive system may furthermore include at least two DC power terminals for connecting the wheel hub drive system, in particular the inverter, to a DC power supply of the vehicle, in particular on the vehicle side.

The wheel hub drive system may furthermore include at least one communications interface for transmitting data between the wheel hub drive system, in particular the controller of the inverter, and a control unit of the vehicle, in particular on the vehicle side. For example, the communication interface may be a CAN connection (CAN: Controller Area Network).

The present invention furthermore relates to a vehicle, in particular an electric vehicle and/or a hybrid vehicle, for example a passenger car, which includes a wheel hub drive system according to the present invention.

BRIEF DESCRIPTION OF THE DRAWINGS

The present invention is explained by way of example below on the basis of preferred exemplary embodiments with reference to the appended drawings, the features illustrated below being able to represent one aspect of the present invention both individually and in combination.

DETAILED DESCRIPTION

Figure 1:
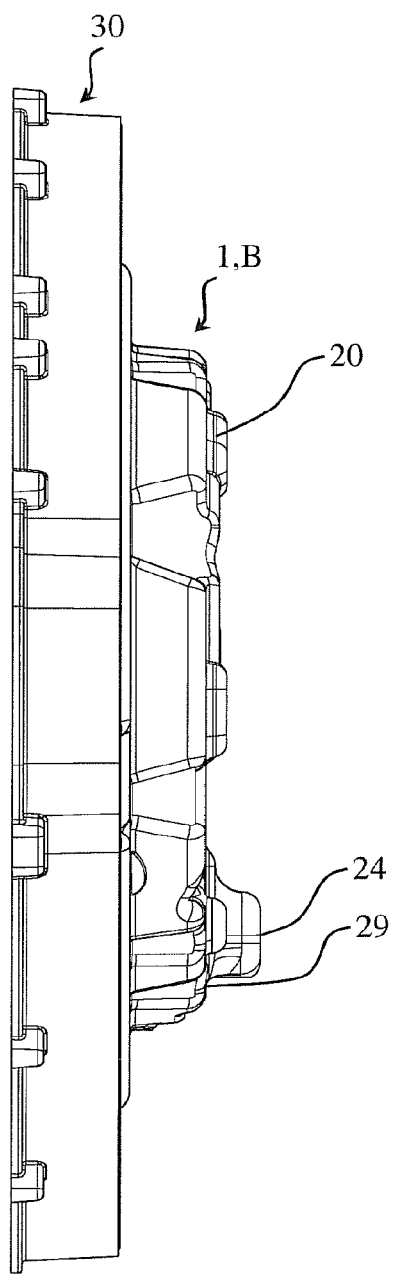
FIG. 1 shows a schematic side view of one specific embodiment of a stator holding plate according to the present invention.

FIG. 1 shows a schematic side view of one specific embodiment of a stator holding plate 1 according to the present invention and illustrates that stator holding plate 1 has an inverter fastening section for fastening an inverter 30 to the vehicle side of stator holding plate 1. Stator holding plate 1 furthermore has a brake anchor plate section B on the wheel side, i.e., on the side facing away from the vehicle in the assembled position, which is used to fasten a brake mechanism of a drum brake to stator holding plate 1 and is designed to be elevated with regard to the inverter fastening section. FIG. 1 shows that brake anchor plate section B includes, among other things, a brake cylinder section 20 for mounting a brake cylinder, a brake shoe counter-bearing section 24 for fastening a brake shoe counter-bearing and a brake drum thrust element fastening section 29 for fastening a thrust element for a brake drum.

Figure 2:
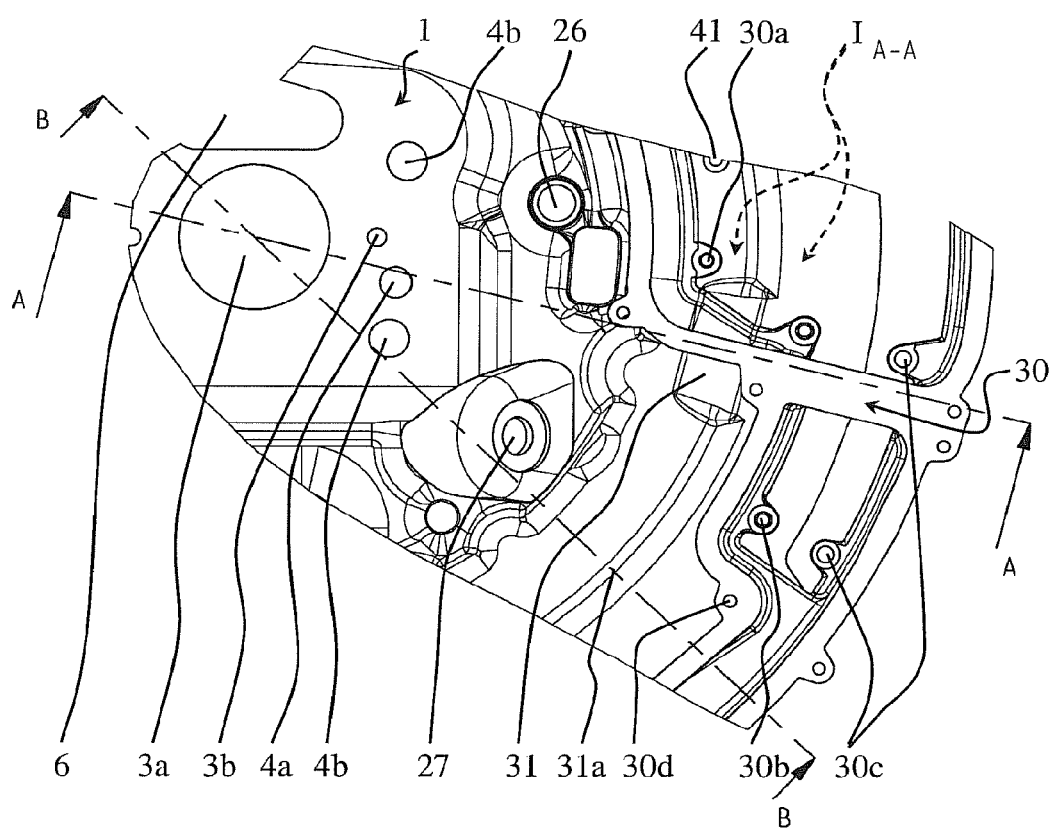
FIG. 2 shows a schematic detail of a top view of the vehicle side of the stator holding plate illustrated in FIG. 1.
Figure 3:
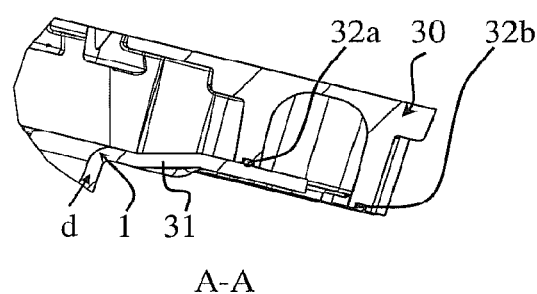
FIG. 3 shows a schematic cross section of the stator holding plate illustrated in FIG. 1 on plane A-A.
Figure 4:
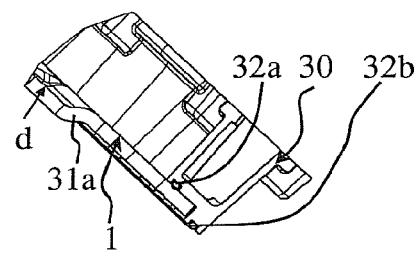
FIG. 4 shows a schematic cross section of the stator holding plate illustrated in FIG. 1 on plane B-B.

FIGS. 2 through 4 show details of stator holding plate 1 illustrated in FIG. 1 and illustrate that inverter fastening section I has two subareas whose planes are axially offset and which are at least partially used as counter-surfaces for an essentially radially running, static seal 32*a* for forming a seal between stator holding plate 1 and an inverter 30 fastened thereto. To achieve a tight seal, inverter fastening section I has two inverter sealing ramps 31 having a slight incline, which are designed to transition seal 32*a* from the one subarea of inverter fastening section I to the other, axially offset subarea of inverter fastening section I. The axial transition may thus advantageously have a smoother design and a much smaller incline than other transition areas 31*a* between the axially offset subareas of inverter fastening section I.

FIGS. 3 and 4 show that another seal 30*b* is provided for forming a seal between inverter 30 and another component, for example a cooling system of an electric motor stator. It may have a one-part or multiple-part design together with seal 32*a* for forming a seal between stator holding plate 1 and inverter 30.

FIG. 2 illustrates that inverter fastening section I has inverter fastening openings 30*a*, 30*b* in both subareas for fastening inverter 30 to stator holding plate 1. Inverter fastening openings 30*a*, 30*b* are provided within an area sealed by seal 32*a*. In particular, inverter fastening openings 30*a*, 30*b* are provided between seals 32*a*, 32*b*.

Figure 5:
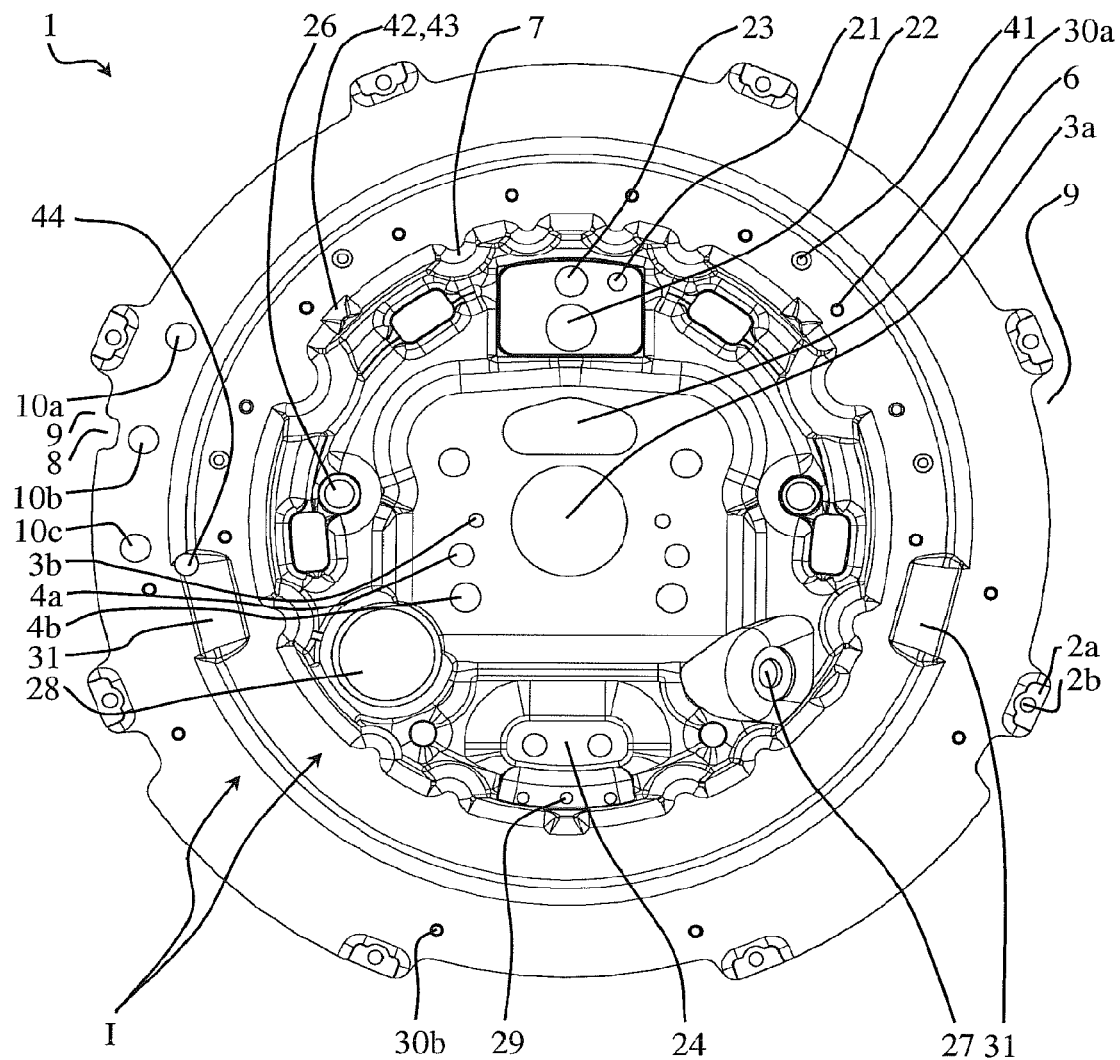
FIG. 5 shows a schematic top view of the vehicle side of the stator holding plate illustrated in FIG. 1.
Figure 6:
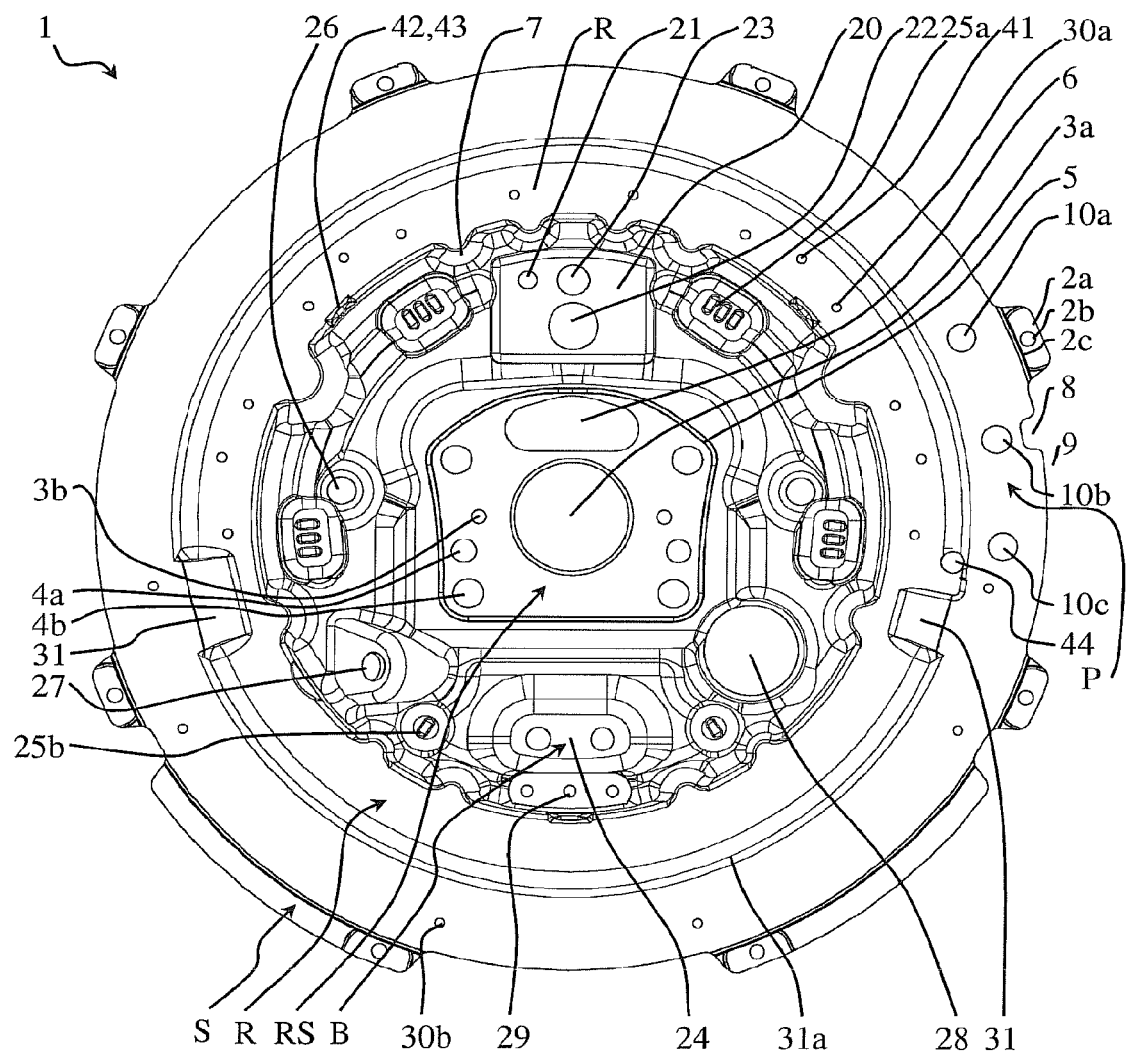
FIG. 6 shows a schematic top view of the wheel side of the stator holding plate illustrated in FIG. 1.

FIG. 5 is a schematic top view of the side of stator holding plate 1 on the vehicle side, of which FIG. 2 shows a detail. FIG. 6 shows the side of stator plate 1 on the wheel side, i.e., the side facing away from the vehicle in the assembled position.

FIGS. 5 and 6 show that stator holding plate 1 has sixteen inverter fastening openings 30*a*, 30*b*, which are used to fasten inverter 30 to stator holding plate 1 with the aid of a screw connection.

In the radially outermost area, stator holding plate 1 has a stator fastening section S for fastening a stator of an electric motor to stator holding plate 1, which has eight stator fastening tabs 2*a*, each equipped with one stator fastening opening 2*b*. Stator fastening openings 2*b*, which are designed in the form of bore holes, are used to fasten the stator of the electric motor with the aid of a screw connection. In addition to stator fastening openings 2*b*, stator fastening tabs 2*a* have an undercut 2*c*, which is used to center the stator on stator holding plate 1 with regard to the rotation axis of the wheel hub drive and into which a collar provided on the stator may be movably and rotatably inserted.

Stator fastening section S has recesses between stator fastening tabs 2*a*. Recesses 9 are used as a coolant line guiding section for bypassing coolant lines around stator holding plate 1. As a result, not only is it possible to supply a coolant to a cooling system of the electric motor, but, if necessary, the cooling system of the electric motor may also be connected to a cooling system of an inverter 30 fastened to the other side of stator holding plate 1. Recess 8 is used as a signal line guiding section for guiding signal lines of a temperature sensor and possibly of an interlock sensor. The remaining six recesses may essentially be used to improve the accessibility of connecting elements to be mounted thereunder, for example for screwing screws and/or for reducing weight.

Stator holding plate 1 furthermore includes numerous reinforcing sections 7 for increasing the mechanical stability of stator holding plate 1 and thus has a three-dimensional structure.

Stator holding plate 1 includes a wheel bearing and/or stator holding plate fastening section RS in a central area for fastening a wheel bearing to stator holding plate 1 and for fastening stator holding plate 1 to a wheel support, for example a torsion beam. Wheel bearing and/or stator holding plate fastening section RS includes a wheel bearing centering opening 3*a* for centering the wheel bearing, in particular a stationary wheel bearing ring, on stator holding plate 1 with the aid of a press fit. Wheel bearing and/or stator holding plate fastening section RS furthermore has two wheel bearing fixing openings 3*b*, with the aid of which the wheel bearing may be fixed on stator holding plate 1 by a screw connection during assembly. In addition, wheel bearing and/or stator holding plate fastening section RS has two bolt lead-through openings 4*a*, through which bolts fastened to a wheel support may be inserted for the purpose of fixing the wheel bearing on stator holding plate 1 and stator holding plate 1 to the wheel support during assembly and during operation. Furthermore, wheel bearing and/or stator holding plate fastening section RS has four wheel bearing and/or stator holding plate fastening openings 4*b*, with the aid of which the wheel bearing may be fastened to stator holding plate 1 and stator holding plate 1 may be fastened to the wheel support, for example with the aid of a screw connection. In addition, wheel bearing and/or stator holding plate fastening section RS has an ABS sensor lead-through opening 6 for leading an ABS sensor or its signal lines through stator holding plate 1.

FIG. 6 shows that wheel bearing and/or stator holding plate fastening section RS furthermore has a wheel bearing sealing groove 5, into which a seal may be inserted or sprayed for forming a seal between the wheel bearing and stator holding plate 1. Wheel bearing sealing groove 5 is designed in the form of a self-contained groove which runs around openings 3*a*, 3*b*, 4*a*, 4*b* provided in wheel bearing and/or stator holding plate fastening section RS.

The central area of stator holding plate 1, in which wheel bearing and/or stator holding plate fastening section RS is provided, is surrounded by a brake anchor plate section B.

FIG. 6 shows that brake cylinder section 20 includes a brake cylinder fastening opening 21 for fastening the brake cylinder to stator holding plate 1, a brake line lead-through opening 22 for leading brake lines through stator holding plate 1 and a brake cylinder venting opening 23 for venting the brake cylinder. FIG. 6 also illustrates that brake anchor plate section B includes six brake shoe abutment sections 25*a*, 25*b* for supporting the brake shoes and/or for fastening the brake shoe bearing. Brake anchor plate section B furthermore includes a brake shoe suspension opening 26 for mounting a suspension for applying an axial force directed toward the brake anchor plate section to a brake shoe.

Moreover, brake anchor plate section B includes a hand brake cable lead-through opening 27, which is oblique at an angle for leading a hand brake cable through stator holding plate 1, and a hand brake maintenance opening 28 for maintaining a hand brake.

FIG. 6 furthermore illustrates that stator holding plate 1 includes a phase guiding section P for leading the phases of the electric motor from the vehicle side of stator holding plate 1 to the wheel side of stator holding plate 1, which is provided radially inwardly adjacent to stator fastening section S and has three phase lead-through openings 10a through 10c. The phases may be guided, for example, from a vehicle-side inverter through stator holding plate 1 to a wheel-side stator of the electric motor, using phase lead-through openings 10 through 10c.

FIG. 6 also illustrates that stator holding plate 1 furthermore includes a resolver fastening section R for fastening a resolver, in particular a resolver stator, to stator holding plate 1, which is provided on the wheel side and surrounds brake anchor plate section B. Resolver fastening section R has four resolver fastening openings 41, which are used to fasten the resolver, in particular the resolver stator and/or a resolver stator support, to stator holding plate 1 with the aid of a screw connection. In addition, resolver fastening section R has three resolver snap-in connecting elements 42, 43, which are provided on stator holding plate 1 for the purpose of fixing as well as centering the resolver, in particular the resolver stator and/or the resolver stator support, on stator holding plate 1. Resolver fastening section R also has a resolver signal line lead-through opening 44 for leading a signal line of the resolver through stator holding plate 1.

Figure 7:
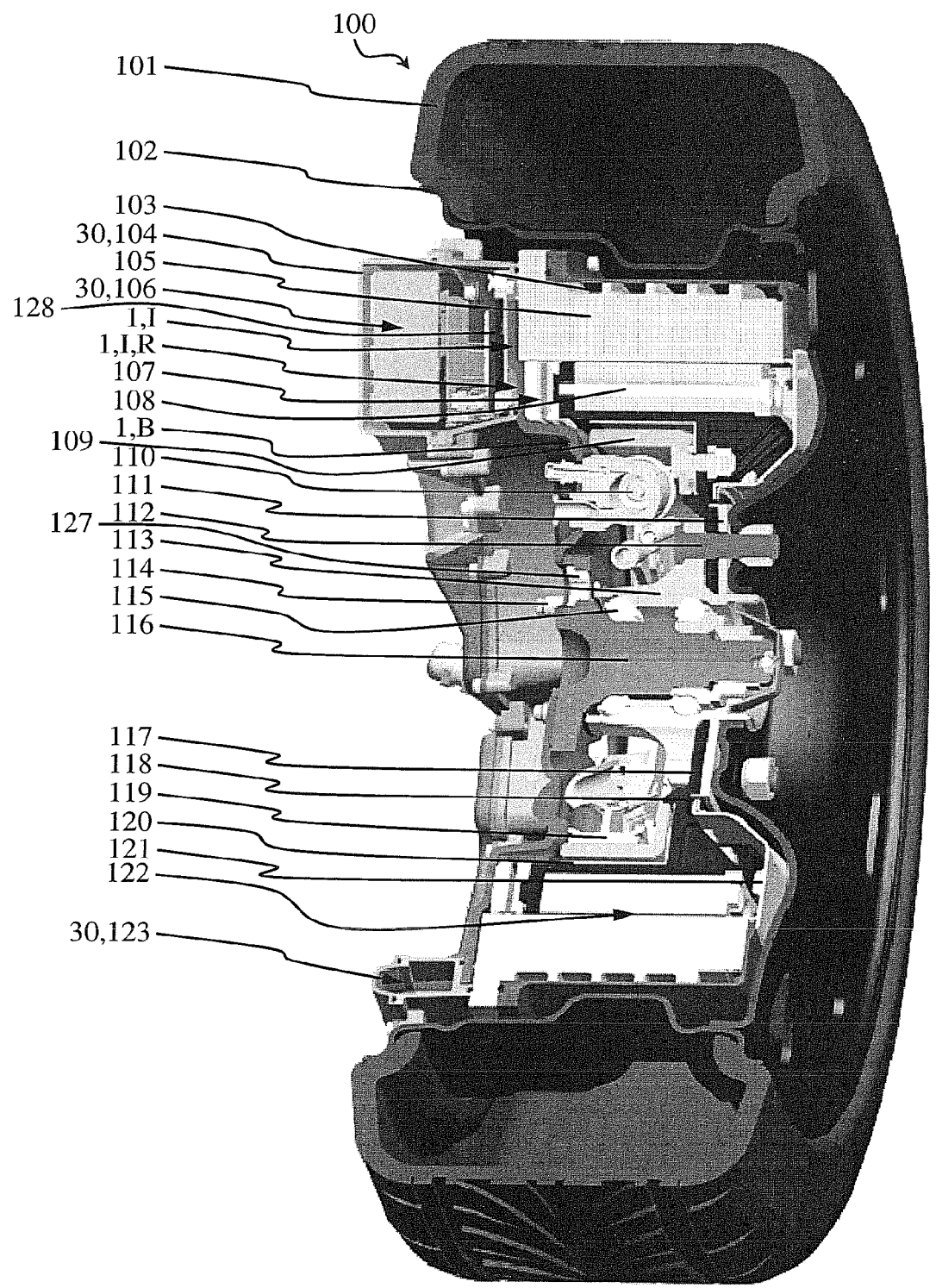
FIG. 7 shows a schematic detail of one specific embodiment of a wheel hub drive system according to the present invention.
Figure 8:
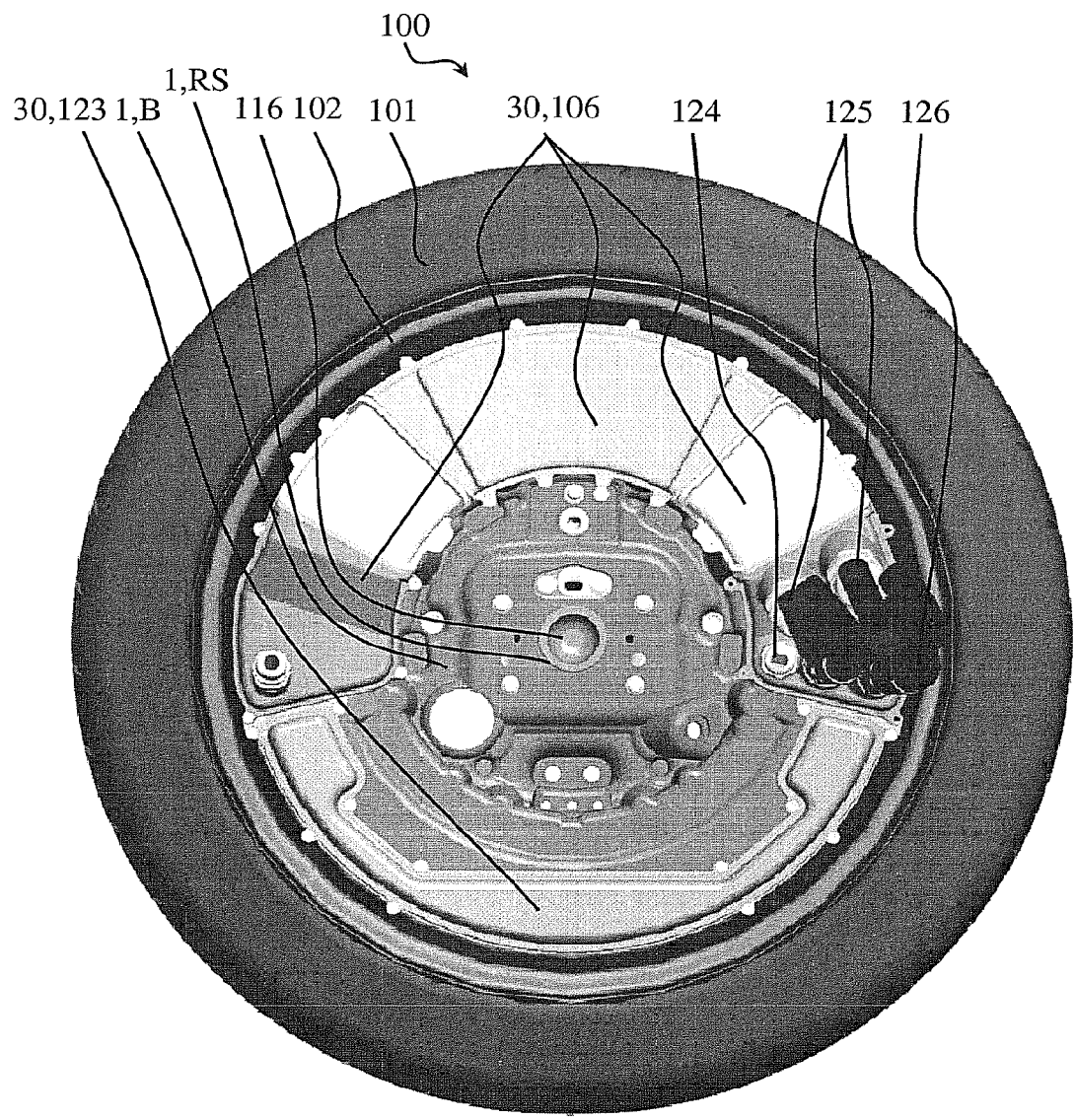
FIG. 8 shows a schematic top view of the vehicle side of the wheel hub drive system illustrated in FIG. 7.

FIGS. 7 and 8 show one specific embodiment of a wheel hub drive system 100 according to the present invention and illustrate that wheel hub drive system 100 is equipped with a tire 101 and includes an electric motor designed as an internal rotor, the electric motor having an electric motor stator 105 having a cooling system 103 and an electric motor rotor 108.

Electric motor stator 103, 105 is fastened to the stator fastening section of the stator holding plate illustrated in FIGS. 4 through 6. The brake mechanism of a drum brake is fastened to the wheel-side brake anchor plate section of stator holding plate 1 and includes, among other things a brake cylinder 110 and brake shoes 119 and is designed to apply a braking force to a brake drum 109 situated radially within electric motor rotor 108 and fastened to a rotor support 117.

A wheel bearing, which has a stationary inner ring 116 and an outer ring 113 which is rotatably supported via rolling bodies 115 in this regard, is integrated into the wheel hub drive system. The stationary inner ring is fastened to the wheel bearing and/or stator holding plate fastening section of stator holding plate 1 as well as to a torsion beam (not illustrated) with the aid of bolts 114. An ABS sensor 127 or its signal line is led through the ABS sensor lead-through opening in the wheel bearing and/or stator holding plate fastening section of stator holding plate 1.

An inverter 30, 104, 106, 123, 128 is fastened to the inverter fastening section on the vehicle side of stator holding plate 1, which includes, among other things, a power electronics system 106, a controller 123, an inverter housing 104 and an inverter cooling system 128, the cooling system of electric motor stator 103 and the inverter cooling system being connected with the aid of a coolant line led through the coolant line guiding section of stator holding plate 1.

The stator of a PC board resolver 107 is fastened to the wheel-side resolver fastening section of stator holding plate 1 with the aid of a resolver stator support. The resolver rotor of PC board resolver 107 is fastened to electric motor rotor 108 in such a way that the resolver stator and the resolver rotor are situated axially in relation to each other, with regard to the rotation axis of wheel hub drive system 100.

Electric motor rotor 108 is connected to rotatable outer ring 113 of the wheel bearing via rotor support 117. Wheel rim 102 is furthermore fastened to rotor support 117 with the aid of a screw connection 112, a wheel rim contact plate 111 being situated between wheel rim 102 and rotor support 117. Illustrated wheel rim 102 is a so-called semi full face wheel rim.

Stator holding plate 1 and wheel rim 102 form an internal chamber, into which electric motor 103, 105, 108, drum brake 109, 110, 119, resolver 107, wheel bearing 113, 115, 116, rotor support 117 and a shielding plate 120 are integrated. Shielding plate 120 is used to protect electric motor rotor 108 against heat radiation coming from drum brake 109, 110, 119.

Internal chamber 101 formed by stator holding plate 1 and wheel rim 102 is closed by an openable sealing holding plate, which seals the internal chamber dirt-tight with the aid of a wheel bearing-proximal, dynamic lip seal 118 for the purpose of protecting magnet gap/air gap 122 between electric motor stator 105 and electric motor rotor 108 against dirt particles.

FIG. 8 also illustrates that the wheel hub drive system has, in addition to inverter 30, 106, 123, a communications interface 124 (CAN connection), two cooling connections 125 and direct current (DC) connections 126 on the vehicle side.

LIST OF REFERENCE NUMERALS

| | |
|---|---|
| 1 | Stator holding plate |
| d | Wall/material thickness |
| S | Stator fastening section |
| 2a | Stator fastening tab |
| 2b | Stator fastening opening |
| 2c | Stator centering element |
| RS | Wheel bearing and/or stator holding plate fastening section |
| 3a | Wheel bearing centering opening |
| 3b | Wheel bearing fixing opening |
| 4a | Bolt lead-through opening |
| 4b | Wheel bearing and/or stator holding plate fastening opening |
| 5 | Wheel bearing sealing groove |
| 6 | ABS sensor lead-through opening |
| 7 | Reinforcing section |
| 8 | Signal line guiding section |
| 9 | Coolant line guiding section |
| P | Phase guiding section |
| 10a-c | Phase lead-through openings |
| B | Brake anchor plate section |
| 20 | Brake cylinder section |
| 21 | Brake cylinder fastening opening |
| 22 | Brake line lead-through opening |
| 23 | Brake cylinder venting opening |
| 24 | Brake shoe counter-bearing section |
| 25a | Brake shoe abutment section |
| 25b | Brake shoe abutment section |
| 26 | Brake shoe suspension opening |
| 27 | Hand brake cable lead-through opening |
| 28 | Hand brake maintenance opening |
| 29 | Brake drum thrust element fastening opening |
| I | Inverter fastening section |
| 30 | Inverter |
| 30a | Inverter fastening opening |
| 30b | Inverter fastening opening |
| 31 | Inverter sealing ramp |
| 31a | Steep transition |
| 32a | Inverter housing seal (stator holding plate) |
| 32b | Inverter housing seal (stator/stator cooling system) |
| R | Resolver fastening section |
| 41 | Resolver fastening opening |
| 42 | Resolver fastening snap-in tab |
| 43 | Resolver centering surface |
| 44 | Resolver signal line lead-through |
| 100 | Wheel hub drive system |
| 101 | Tire |
| 102 | Wheel rim |
| 103 | Stator cooling system |
| 104 | Inverter housing |
| 105 | Electric motor stator (stator) |
| 106 | Inverter power electronics system |
| 107 | Resolver |
| 108 | Electric motor rotor (rotor) |
| 109 | Brake drum |
| 110 | Brake cylinder |
| 111 | Wheel rim contact plate |
| 112 | Screw connection |

| | |
|---|---|
| 113 | Rotating wheel bearing ring |
| 114 | Stator holding plate and wheel bearing fastening bolt |
| 115 | Rolling bodies |
| 116 | Stationary wheel bearing ring |
| 117 | Rotor support |
| 118 | Dynamic seal |
| 119 | Brake shoe |
| 120 | Shielding plate |
| 121 | Seal holding plate |
| 122 | Magnet gap/air gap |
| 123 | Inverter controller |
| 124 | Communications interface, CAN connection |
| 125 | Cooling connections |
| 126 | Direct current (DC) connections |
| 127 | ABS sensor |
| 128 | Inverter cooling system |

What is claimed is:

1. A wheel hub drive system for an electric or a hybrid vehicle, comprising:
    an electric motor having an electric motor stator and an electric motor rotor;
    an inverter, the inverter being situated adjacent to the electric motor; and
    a stator holding plate, the electric motor stator and the inverter being fastened to the stator holding plate, the stator holding plate including a stator fastening section for fastening the electric motor stator to the stator holding plate and an inverter fastening section for fastening the inverter to the stator holding plate, wherein
    the stator holding plate further includes:
        a brake anchor plate section for fastening a brake mechanism of a drum brake to the stator holding plate;
        a wheel bearing and stator holding plate fastening section for fastening a wheel bearing to the stator holding plate and for fastening the stator holding plate to a wheel support;
        a phase guiding section for guiding the phases of the electric motor from one side of the stator holding plate to another side of the stator holding plate; and
        a resolver fastening section for fastening a resolver to the stator holding plate;
        the wheel bearing and stator holding plate fastening section being provided in a central area of the stator holding plate;
        the stator fastening section being provided in a radially outer area of the stator holding plate;
        the brake anchor plate section and the phase guiding section and the inverter fastening section and the resolver fastening section being provided between the wheel bearing and stator holding plate fastening section and the stator fastening section;
        the brake anchor plate section being provided on the wheel side;
        the inverter fastening section being provided on the vehicle side; and
        the resolver fastening section being provided on the wheel side.

2. The wheel hub drive system as recited in claim 1 wherein the inverter fastening section and the inverter are shaped in such a way that the inverter forms a seal against the inverter fastening section.

3. The wheel hub drive system as recited in claim 1 further comprising a seal situated between the inverter fastening section and the inverter.

4. The wheel hub drive system as recited in claim 1 wherein the inverter includes a controller.

\* \* \* \* \*